(12) United States Patent
Tompkins et al.

(10) Patent No.: US 9,722,235 B2
(45) Date of Patent: Aug. 1, 2017

(54) REMOTE CONTROL UNIT WITH BATTERY ISOLATION TAB

(71) Applicant: Oculus VR, LLC, Menlo Park, CA (US)

(72) Inventors: Glen Jason Tompkins, Woodinville, WA (US); Peter Wesley Bristol, Seattle, WA (US); Quinton Morris, Issaquah, WA (US)

(73) Assignee: Oculus VR, LLC, Menlo Park, CA (US)

( * ) Notice: Subject to any disclaimer, the term of this patent is extended or adjusted under 35 U.S.C. 154(b) by 0 days.

(21) Appl. No.: 14/967,130

(22) Filed: Dec. 11, 2015

(65) Prior Publication Data

US 2017/0170446 A1 Jun. 15, 2017

(51) Int. Cl.
*H01M 2/34* (2006.01)
*H01M 2/30* (2006.01)
*H01M 2/10* (2006.01)
*G08C 17/02* (2006.01)

(52) U.S. Cl.
CPC .............. *H01M 2/34* (2013.01); *G08C 17/02* (2013.01); *H01M 2/1044* (2013.01); *H01M 2/30* (2013.01); *H01M 2220/30* (2013.01)

(58) Field of Classification Search
CPC .... G08C 17/02; G08C 23/04; G08C 2201/42; H01M 2/0404; H01M 2/34; H01M 2/30; H01M 2/1044; H01M 2220/30
See application file for complete search history.

(56) References Cited

U.S. PATENT DOCUMENTS

| 4,574,285 | A | 3/1986 | Bascou |
| 5,422,783 | A | 6/1995 | Darbee et al. |
| 5,504,658 | A | 4/1996 | Matsuda et al. |
| 5,704,087 | A * | 1/1998 | Strub ................ A46B 15/0008 15/105 |
| 5,801,918 | A | 9/1998 | Ahearn et al. |
| 5,805,423 | A | 9/1998 | Wever et al. |
| 6,633,483 | B2 | 10/2003 | Akagi et al. |
| 6,988,664 | B1 | 1/2006 | Lee et al. |
| 7,091,899 | B2 | 8/2006 | Imamura et al. |
| D570,793 | S | 6/2008 | Ikeda et al. |

(Continued)

OTHER PUBLICATIONS

Notice of Allowance mailed Sep. 8, 2016, for U.S. Appl. No. 29/529,911 by Bristol, P. et al., filed Jun. 11, 2015.

(Continued)

*Primary Examiner* — Thomas Alunkal
(74) *Attorney, Agent, or Firm* — Perkins Coie LLP

(57) ABSTRACT

Handheld remote control assemblies with battery isolation tabs are disclosed. An assembly includes a body and a battery pocket formed in the body and defined by a sidewall and a lower surface. An electrical connection terminal is disposed on the lower surface, and a battery is disposed within the battery pocket. The body includes a channel formed therein and extending between the battery pocket and an edge of the body. A battery isolation tab includes a head portion disposed between the battery and the electrical connection terminal, a handle portion disposed external to the body, and a neck portion extending between the head portion and the handle portion, the neck portion at least partially received within the channel formed in the body.

17 Claims, 10 Drawing Sheets

(56) References Cited

U.S. PATENT DOCUMENTS

| | | |
|---|---|---|
| D571,305 S | 6/2008 | Thursfield et al. |
| D578,079 S | 10/2008 | Huang et al. |
| 7,435,508 B2 | 10/2008 | Lee et al. |
| 7,456,777 B2 | 11/2008 | Piekarz et al. |
| D593,509 S | 6/2009 | Glassman et al. |
| D597,038 S | 7/2009 | Glassman et al. |
| 7,586,732 B2 | 9/2009 | Myers et al. |
| D602,916 S | 10/2009 | Won et al. |
| D605,177 S | 12/2009 | Madonna et al. |
| 7,839,627 B2 | 11/2010 | Fukui et al. |
| 7,916,460 B2 | 3/2011 | Henty et al. |
| D645,848 S | 9/2011 | Arnholt et al. |
| 8,018,726 B2 | 9/2011 | Friedlander et al. |
| 8,068,332 B2 | 11/2011 | Yang et al. |
| 8,072,737 B2 | 12/2011 | Glover et al. |
| D688,232 S | 8/2013 | Zhang et al. |
| 8,570,718 B2 | 10/2013 | Gao |
| D693,332 S | 11/2013 | Lee et al. |
| D728,530 S | 5/2015 | Shin et al. |
| D742,361 S | 11/2015 | Choi et al. |
| 9,176,578 B2 | 11/2015 | Nomura et al. |
| D746,266 S | 12/2015 | Kwon et al. |
| D752,025 S | 3/2016 | Akana et al. |
| D752,555 S | 3/2016 | Langhammer et al. |
| 9,298,255 B2 | 3/2016 | Kimura |
| D772,821 S | 11/2016 | Bristol et al. |
| 2001/0035442 A1 | 11/2001 | Yokobori et al. |
| 2003/0201903 A1 | 10/2003 | Shen et al. |
| 2003/0224243 A1 | 12/2003 | Maeda et al. |
| 2004/0196621 A1 | 10/2004 | Nakamura et al. |
| 2004/0237308 A1* | 12/2004 | Mitchell ............... B26B 19/14 30/43.6 |
| 2005/0270735 A1 | 12/2005 | Chen et al. |
| 2008/0190528 A1 | 8/2008 | Steinberg et al. |
| 2008/0219657 A1 | 9/2008 | Suzuki et al. |
| 2009/0156990 A1* | 6/2009 | Wenger ............ A61M 5/14244 604/67 |
| 2009/0185071 A1 | 7/2009 | Suzuki et al. |
| 2009/0303670 A1 | 12/2009 | Enomoto et al. |
| 2010/0007517 A1* | 1/2010 | Andrews ............... G08C 17/02 340/12.54 |
| 2010/0033911 A1 | 2/2010 | Chang et al. |
| 2010/0102576 A1 | 4/2010 | Zhang et al. |
| 2010/0118476 A1 | 5/2010 | Li et al. |
| 2010/0165554 A1 | 7/2010 | Dong et al. |
| 2010/0191078 A1* | 7/2010 | Yodfat ............... A61B 5/14532 600/309 |
| 2010/0238640 A1 | 9/2010 | Yang |
| 2010/0304797 A1 | 12/2010 | Yang et al. |
| 2010/0328857 A1 | 12/2010 | Dong et al. |
| 2011/0304469 A1* | 12/2011 | Rutter ............... G08B 17/00 340/628 |
| 2013/0149566 A1* | 6/2013 | Yau ............... H01M 10/488 429/50 |
| 2013/0176243 A1 | 7/2013 | BianRosa et al. |
| 2014/0184386 A1* | 7/2014 | Regler ............... G08B 5/228 340/7.61 |
| 2015/0022956 A1* | 1/2015 | Olson ............... H05K 7/00 361/679.01 |
| 2015/0109721 A1 | 4/2015 | Willcocks et al. |
| 2015/0138070 A1 | 5/2015 | Iwatsu |
| 2015/0234189 A1 | 8/2015 | Lyons et al. |
| 2015/0235435 A1 | 8/2015 | Abovitz et al. |
| 2015/0262475 A1* | 9/2015 | Helmy ............... G08C 17/02 340/12.3 |
| 2016/0035136 A1 | 2/2016 | Sendai et al. |
| 2016/0286943 A1 | 10/2016 | Andersen et al. |

OTHER PUBLICATIONS

U.S. Appl. No. 29/576,052 by Bristol, P., et al., filed Aug. 31, 2016.
Notice of Preliminary Rejection mailed May 19, 2016 in Korean Patent Application No. 30-2015-0063435 by Bristol, P., et al., filed Dec. 11, 2015.
Blain, L., "'Ancient' Oculus Rift concepts leak new controller and front-facing camera," gamesradar+, retrieved online from <http://www.gamesradar.com/new-oculus-rift-and-its-fancy-new-controller/>,dated Jun. 9, 2015.
First Examiner's Report mailed Feb. 25, 2016, for Australian Patent Application No. 201516613 by Bristol, P. et al., filed Dec. 8, 2015.
First Examiner's Report mailed Feb. 25, 2016, for Australian Patent Application No. 201516615 by Bristol, P. et al., filed Dec. 8, 2015.
First Examiner's Report mailed Apr. 5, 2016, for Canadian Patent Application No. 167,210 by Bristol, P. et al., filed Jul. 6, 2015.
First Examiner's Report mailed Feb. 4, 2016, for Israeli Design Patent Application No. 57746 by Bristol, P. et al., filed Nov. 26, 2015.
First Examiner's Report mailed Mar. 18, 2016, for Indian Design Patent Application No. 278150 by Bristol, P. et al., filed Dec. 7, 2015.
First Examiner's Report mailed Mar. 18, 2016, for Indian Design Patent Application No. 278169 by Bristol, P. et al., filed Dec. 8, 2015.
First Examiner's Report mailed Nov. 19, 2015, for Canadian Patent Application No. 163,149 by Bristol, P. et al., filed Jul. 6, 2015.
Lang, B., "Oculus Rift Input Controller Revealed in Leaked 'Placehold Concept," Road Tovr, retrieved online at <http://www.roadtovr.com/oculus-rift-input-controller-revealed-in-leaked-placeholder-concept/>, dated Jun. 9, 2015.
Notification of Reasons for Rejection mailed Apr. 1, 2016 in Japanese Patent Application No. 2015027702 by Bristol, P., et al., filed Dec. 11, 2015.
Notification of Reasons for Rejection mailed Apr. 1, 2016 in Japanese Patent Application No. 2015027703 by Bristol, P., et al., filed Dec. 11, 2015.
Orland, K., "Leaked images could point to Oculus controller, final Rift design," arsTechnica, retrieved online from <http://arstechnica.com/gaming/2015/06/leaked-images-could-point-to-oculus-controller-final-rift-design/>, dated Jun. 10, 2015.
Restriction Requirement mailed Jun. 17, 2016, for U.S. Appl. No. 29/529,911 by Bristol, P. et al., filed Jun. 11, 2015.
U.S. Appl. No. 14/934,102 by Tompkins, G., et al., filed Nov. 5, 2015.
U.S. Appl. No. 14/935,358 by Tompkins, G., et al., filed Nov. 6, 2015.
U.S. Appl. No. 29/529,911 by Bristol, P., et al., filed Jun. 11, 2015.
Non-Final Office Action mailed Feb. 23, 2017, for U.S. Appl. No. 14/935,358 by Tompkins, G. et al., filed Nov. 6, 2015.
Non-Final Office Action mailed Mar. 27, 2017, for U.S. Appl. No. 14/934,102 by Tompkins, G., et al., filed Nov. 5, 2015.
Notice of Allowance mailed Mar. 21, 2017 for U.S. Appl. No. 29/576,052 by Bristol, P., et al., filed Aug. 31 2016.
Office Action mailed Mar. 14, 2017 in Mexican Patent Application No. MX/f/2015/003771, by Bristol, P., et al. filed Dec. 11, 2015.

* cited by examiner

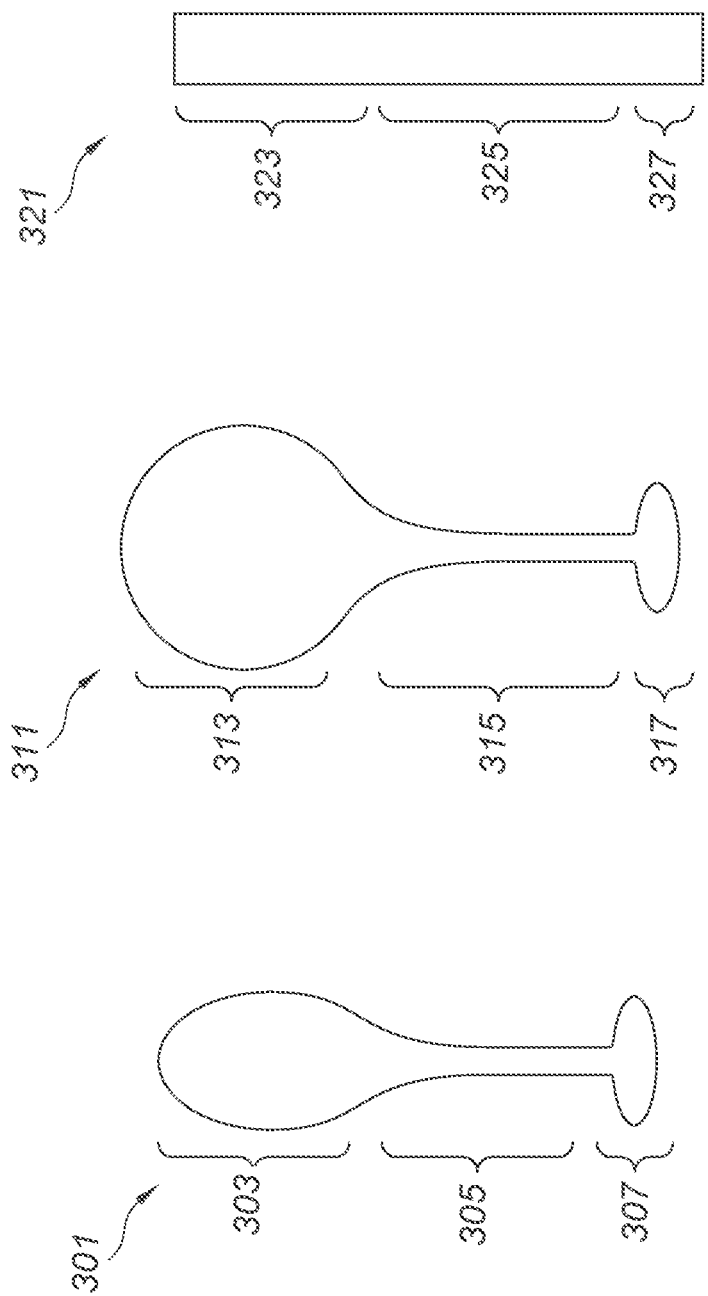

REMOTE CONTROL UNIT WITH BATTERY ISOLATION TAB

TECHNICAL FIELD

This patent application is directed to wireless electronic mechanisms, including handheld electronic devices with battery isolation tabs.

BACKGROUND

Handheld electronic devices such as remote controls are often powered by one or more replaceable batteries, each typically received in a pocket formed within the device, such that the battery abuts against electrical connection terminals. During storage of the device, for example during initial delivery and before the device has been purchased and deployed by a user, the power in the battery can be partially drained due to ongoing contact between the battery and electrical connection terminals.

BRIEF DESCRIPTION OF THE DRAWINGS

Embodiments of the handheld electronic device with a battery isolation tab introduced herein may be better understood by referring to the following Detailed Description in conjunction with the accompanying drawings, in which like reference numerals indicate identical or functionally similar elements:

FIGS. 10A-10C illustrate different embodiments of battery isolation tabs.

Figure 1:
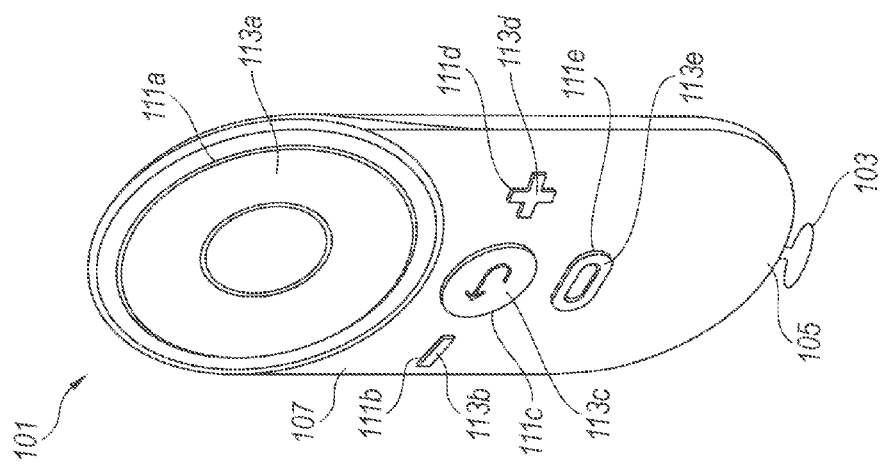
FIG. 1 is an isometric view of a handheld electronic device in accordance with an embodiment of the present technology.
Figure 2:
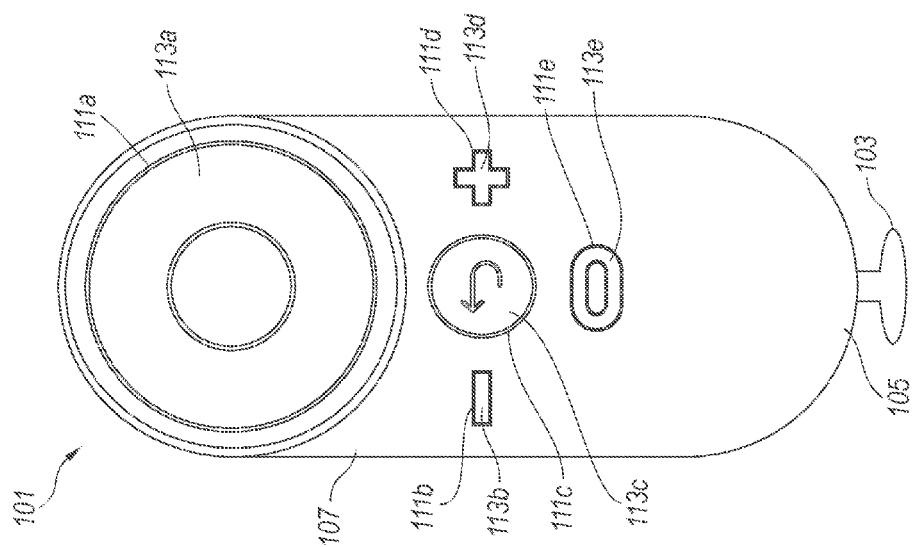
FIG. 2 is a front plan view of the handheld electronic device of FIG. 1.
Figure 3:
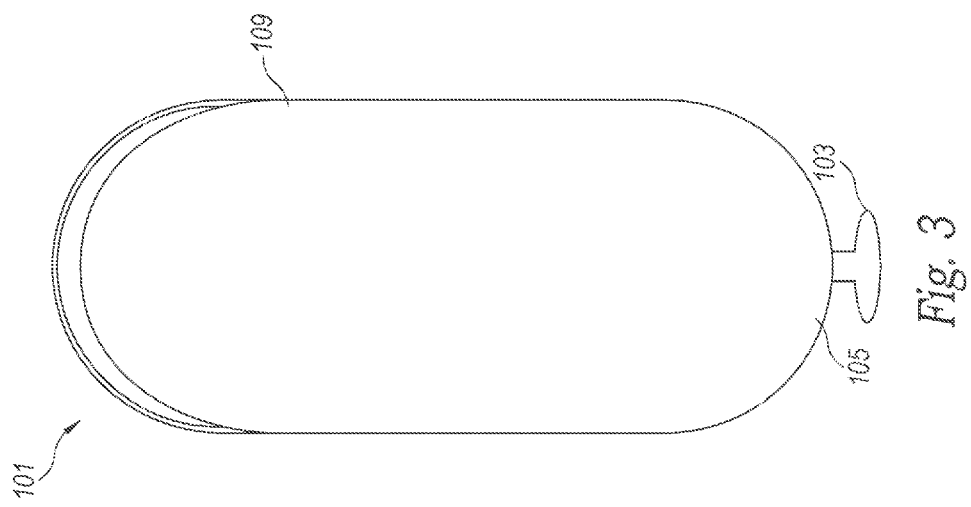
FIG. 3 is a rear plan view of the handheld electronic device of FIGS. 1 and 2.
Figure 4:
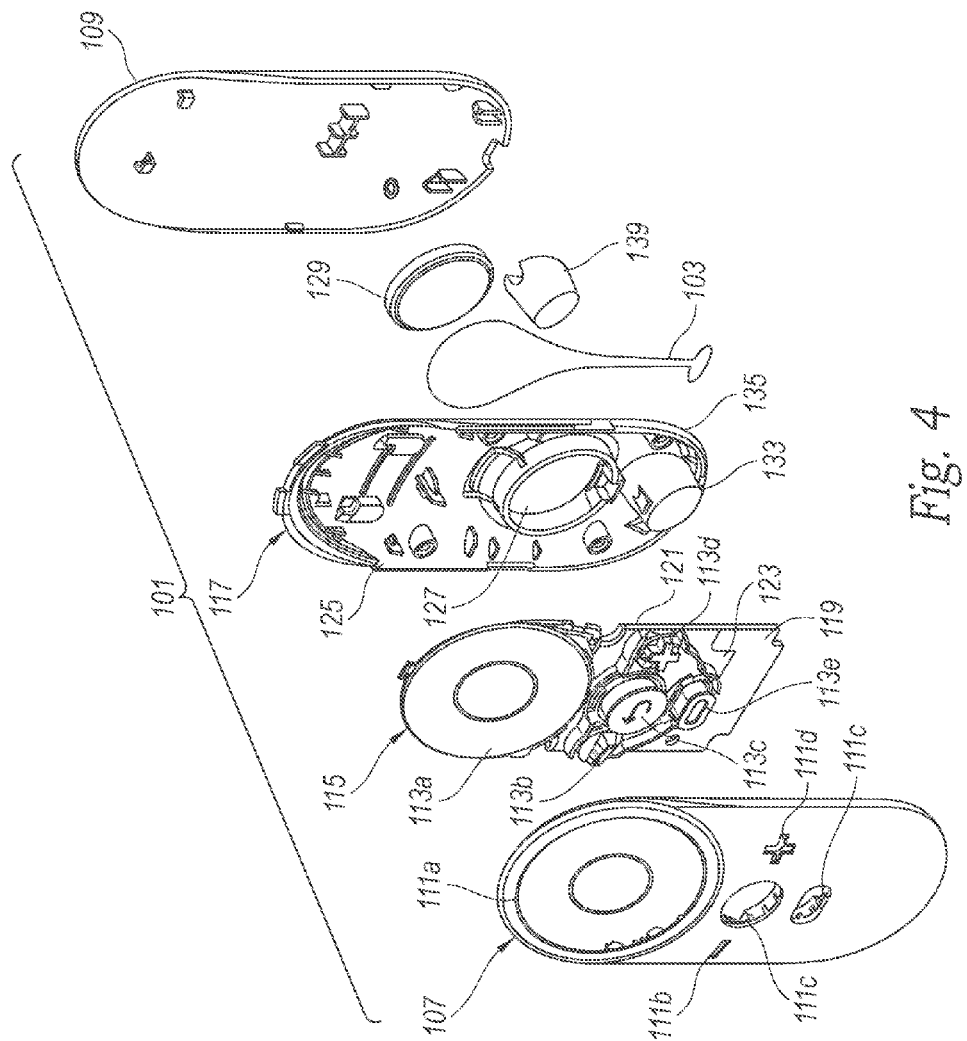
FIG. 4 is a partially exploded isometric view of the handheld electronic device of FIGS. 1-3.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments.

DETAILED DESCRIPTION

Overview

A remote control unit having a battery isolation tab is disclosed. The battery isolation tab preserves the charge of a battery pre-installed in an electronic device, such as a handheld remote control. The battery isolation tab is disposed between a terminal of the battery and an electrical connection terminal of the device. In some embodiments, the tab is a flexible plastic tab. The tab can extend into the battery housing through a channel formed in the body of the device. Accordingly, the tab extends from outside the device, through the channel, and between the electrical connection terminal and the battery. A rear housing can be attached to the body to enclose the battery and channel. A user may remove the battery isolation tab by grasping the tab and pulling it from between the battery and the electrical connection terminal.

General Description

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

FIGS. 1-4 are isometric, front, rear, and exploded views, respectively, of a handheld electronic device 101. The handheld electronic device 101 is illustrated and described throughout as a remote control device, however in other embodiments the handheld electronic device 101 can take other forms or perform other functions. For example, in some embodiments the handheld electronic device 101 can be any small, portable electronic device, such as a media player, smartphone, camera, an RFID transponder, or other electronic device powered by a removable battery.

Referring to FIGS. 1-4 together, the illustrated device 101 has a substantially oblong shape. A portion of a battery isolation tab 103 extends away from a lower portion 105 of the device 101. The device 101 includes a front housing 107 that mates with a corresponding rear housing 109. The front housing 107 includes a plurality of openings 111a-e that receive a plurality of user input controls 113a-e therethrough. For example, the first user input control 113a can include a touch-sensitive surface that allows a user to provide input via touching or moving the user's finger across a touch-sensitive surface of the control 113a, and/or by depressing a button portion of the control 113a. Second and third user input controls 113b and 113c are volume-down and volume-up buttons, respectively, while the fourth user input control 113d provides a return or "back" function. The fifth user input control 113e is a power button. In other embodiments the user input controls can take a variety of configurations, including other touch-sensitive surfaces, depressible-buttons, or any other input mechanism.

Sandwiched between the front housing 107 and the rear housing 109 are an internal control assembly 115 and a support body portion 117. The internal control assembly 115 includes the plurality of input controls 113*a-e* on a front side 119 that faces toward the front housing 107. The control assembly 115 can include a printed circuit board 123, carrying associated electronics configured to process user input provided via the controls 113*a-e* and perform various other electronic functions of the device 101.

The support body portion 117 has a front side 125 that mates with the internal control assembly 115. The support body portion 117 also includes a lanyard receptacle 133 formed in a back side 135 of the support body portion 117 adjacent to the aperture 127. A lanyard anchor 139 is configured to be removably received within the lanyard receptacle 133. The lanyard anchor 139 and the lanyard receptacle 133 are described in more detail in U.S. application Ser. No. 14/934,102, titled Remote Control Unit with Lanyard Attachment Mechanism, filed Nov. 5, 2015, which is hereby incorporated by reference in its entirety. The support body portion 117 further includes an aperture 127 that provides access to a portion of the backside 121 of the control assembly 115 having electrical connection terminals 131*a*, 131*b* (FIGS. 5-8) that releasably receive a battery 129. When assembled, the aperture 127 and the back 121 of the control assembly 115 can together define a battery pocket 141 configured to receive the battery 129 therein. Accordingly, the battery 129 can be installed through the aperture 127 when the rear housing 109 is removed from the support body portion 117.

Figure 5:
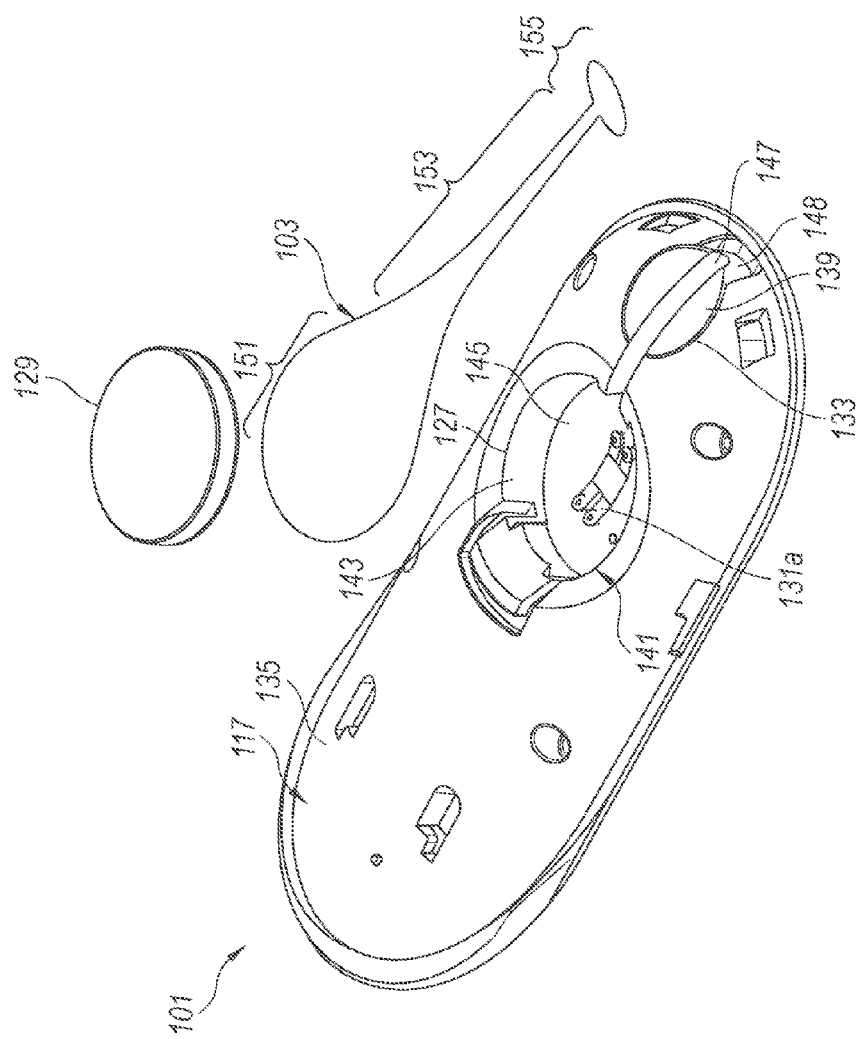
FIG. 5 is a partially exploded lower rear isometric view of the handheld electronic device of FIGS. 1-4 with the rear housing not shown for purposes of clarity.
Figure 6:
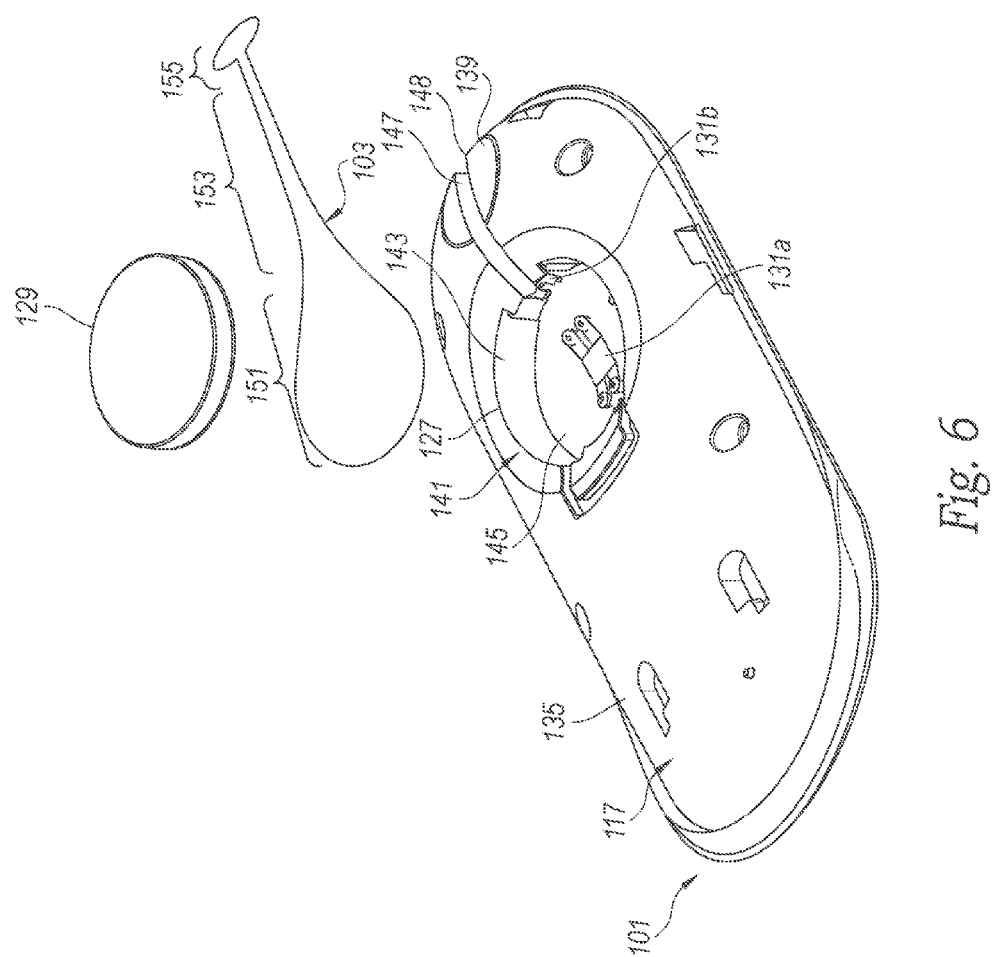
FIG. 6 is a partially exploded upper rear isometric view of the handheld electronic device of FIGS. 1-5 with the rear housing not shown for purposes of clarity.

FIGS. 5 and 6 are a partially exploded lower and upper rear isometric views, respectively, of the device 101 with the rear housing not shown for purposes of clarity. Referring to FIGS. 5 and 6 together, the battery 129 of the illustrated embodiment is a button-cell style battery with a squat, substantially cylindrical shape, and the battery pocket 141 has a corresponding substantially cylindrical shape. The battery pocket 141 is defined by a sidewall 143 and a lower surface 145. The lower surface 145 is part of the backside 121 of the control assembly 115. The first connection terminal 131*a* is disposed at a first, substantially central location on the lower surface 145, and the second connection terminal 131*b* is disposed at a second location on the lower surface 145, adjacent to the sidewall 143 of the aperture 127. When the battery 129 is disposed within the battery pocket 141, portions of the battery 129 are in electrical connection with the first connection terminal 131*a* and the second connection terminal 131*b*, thereby enabling the battery 129 to power the device 101. In the illustrated embodiment, the support body portion 117 has one or more battery retention features that releasably retain the battery in the battery pocket 141. The retention features can include a flexible latch arm and/or flanges adjacent to the battery pocket 141 as described in more detail in U.S. application Ser. No. 14/935,358, titled Remote Control Unit with Battery Retention Mechanism, filed Nov. 6, 2015, which is hereby incorporated by reference in its entirety.

A channel 147 is formed in the rear surface 135 of the support body portion 117, including in the rear surface of the lanyard anchor 139. The channel 147 extends between the battery pocket 141 and an edge 148 of the device 101. In other embodiments, the channel 147 take the form of a tunnel formed within the support body portion 117 and/or the lanyard anchor 139, rather than being formed in the rear surface of these structures.

The battery isolation tab 103 can be positioned between the battery 129 and the support body portion 117, so that one or more portions of the battery isolation tab 103 is physically located between the battery 129 and the first and/or second connection terminals 131*a* and 131*b*. The battery isolation tab 103 of the illustrated embodiment includes a head portion 151, a handle portion 155, and a neck portion 153 integrally interconnected and extending between the head portion 151 and the handle portion 155. The battery isolation tab 103 is made of a strong, flexible, lubricious, non-conductive material such as mylar, plastic, or other suitable non-conductive material. When the battery isolation tab 103 is in and installed position, the battery isolation tab 103 is positioned at least partially in the battery pocket 141 and the channel 147 of the device 101. In the illustrated embodiment, the head portion 151 is positioned within the battery pocket 141, while the neck portion 153 is positioned at least partially within the channel 147. In the illustrated embodiment, the head portion 151 is shown as having a shape generally corresponding to the shape of the battery pocket 141, which can be beneficial to ensure proper alignment within the battery pocket 141. In other embodiments, the head portion 151 can have other shapes or sizes relative to the battery pocket 141. The handle portion 155 then extends away from the channel 147 and beyond the edge 148 of the device 101, so as to provide a portion of the battery isolation tab 103 that a user can grasp and pull to move the battery isolation tab from the installed position to a removed position. The battery 129 is inserted into the battery pocket 141 over the head portion 151 of the battery isolation tab 103 with the head portion 151 between the battery 129 and the connection terminals 131*a* and 131*b*. In this position, the head portion 151 of the battery isolation tab 103 electrically isolates the battery 129 from the first connection terminal 131*a* and the second connection terminal 131*b*.

Figure 7:
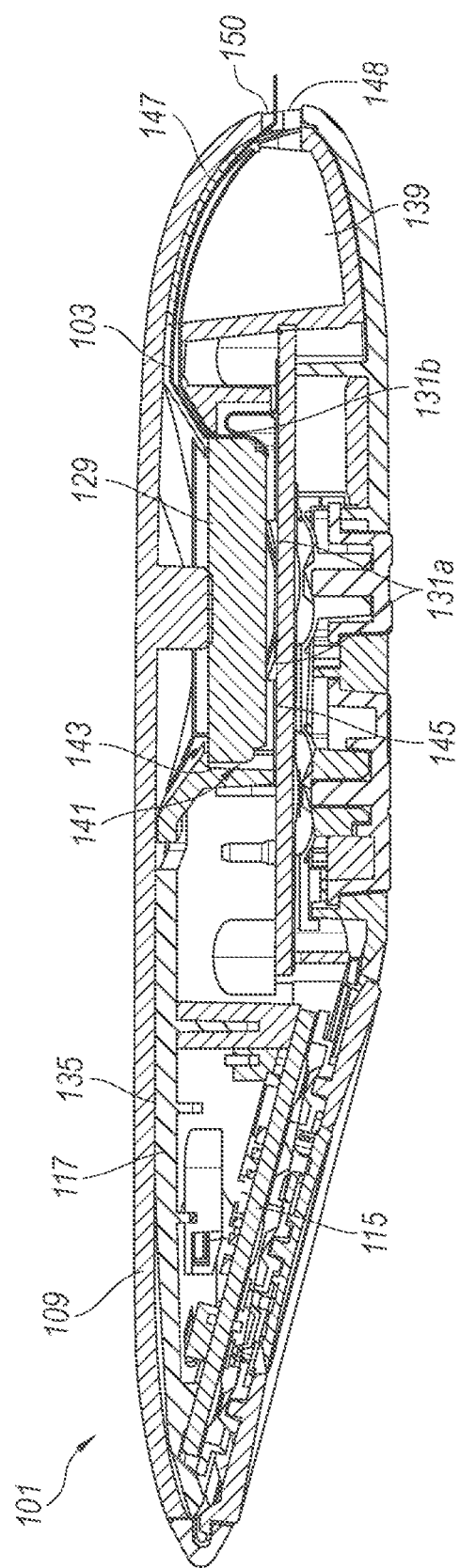
FIG. 7 is a cross-sectional view of the handheld electronic device taken substantially along line 7-7 of FIG. 6.
Figure 8:
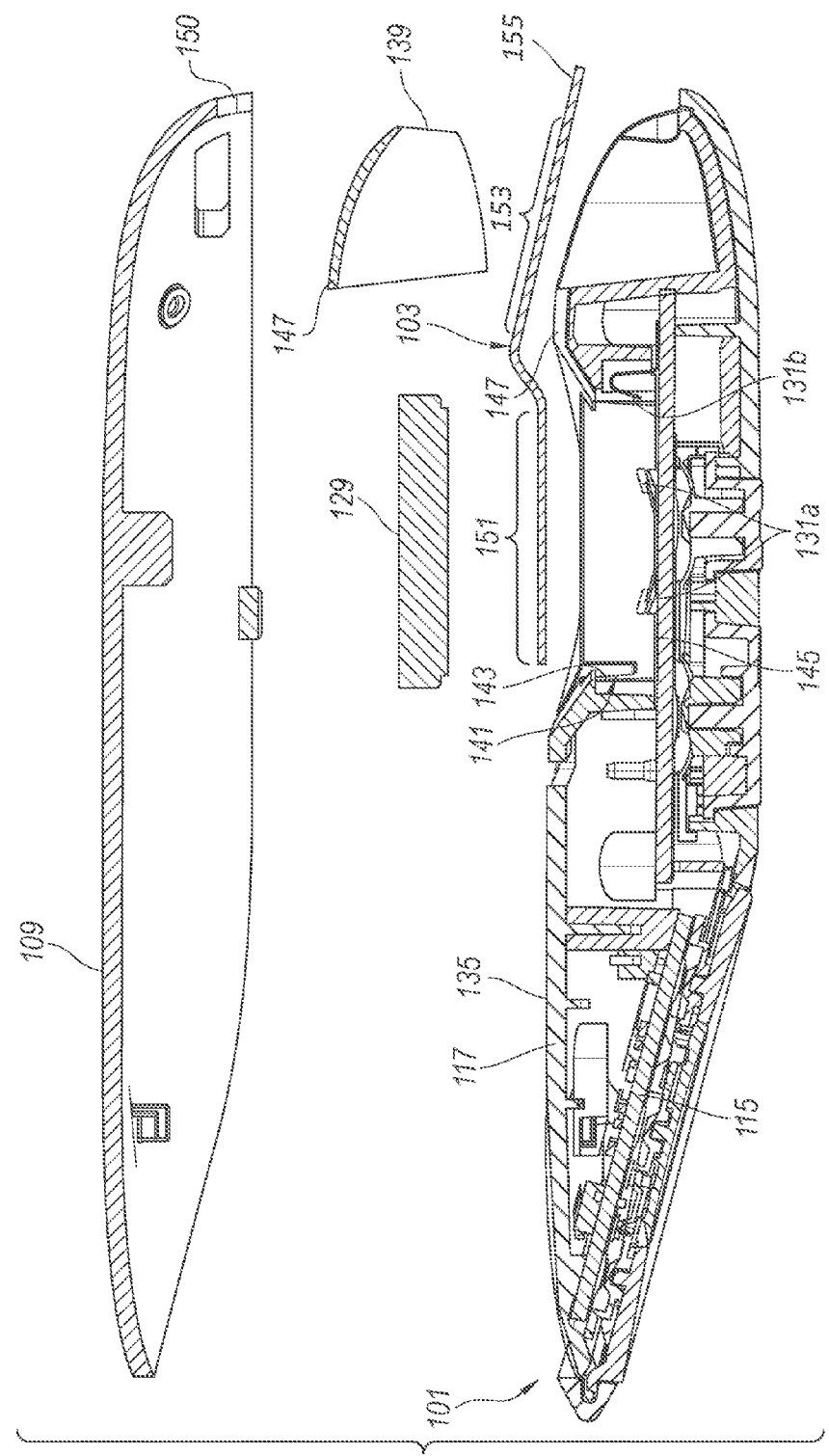
FIG. 8 is a partially exploded side cross-sectional view of the handheld electronic device of FIG. 7.

FIG. 7 is a cross-sectional view of the device 101, and FIG. 8 is a partially exploded cross-sectional view of the device 101. Referring to FIGS. 7 and 8 together, the battery isolation tab 103 is positioned between the battery 129 and the lower surface 145 of the battery pocket 141, thereby electrically isolating the battery 129 from the first and second connection terminals 131*a* and 131*b*. In particular, the second connection terminal 131*b* is covered by part of the head portion 151 which bends upwardly and joins the neck portion 153. In alternate embodiment, the battery isolation tab 103 can be shaped to isolate only one of the first or second connection terminals 131*a* or 131*b*, as shown and described in more detail below with respect to FIG. 9. The neck portion 153 of the battery isolation tab 103 extends away from the battery pocket 141 and through the channel 147. The rear housing 109 covers the battery 129, the battery pocket 141, and the head portion 151 and neck portion 153 of the battery isolation tab 103. The handle portion 155 of the battery isolation tab 103 is exterior of the device 101 and extends away from the edge 148 of the device 101 through an opening 150 in the rear housing 109.

The battery isolation tab 103 in the installed position provides a physical interruption that prevents the battery 129 from prematurely contacting one or both of the contact terminals 131*a* and 131*b* and being drained while in position in the battery pocket 141. To allow the battery 129 to provide power the device 101, the battery isolation tab 103 can be moved from the installed position to the removed position, wherein the battery 129 can engage the first and second contact terminals 131a and 131b. For example, the handle portion 155 of the battery isolation tab 103 protruding from the device 101 can be grasped by a user and pulled axially away from the device 101, so that the head portion 151 slips smoothly out from between the battery 129 and the contact terminals 131a and 131b without damaging the contact terminals. As the battery isolation tab 103 is made of a strong, thin, lubricious, flexible material, the head portion 151 and the neck portion 153 can both be pulled through the channel 147 and out of the device 101 through the opening 150 in the rear housing 109. The neck portion 153 and/or head portion 151 are configured so they can deform and smoothly slide through the channel 147 toward the removed position without substantially binding or breaking. For example, the head portion 151 can include score or fold lines configured to allow the head portion 151 to deform in a predetermined and controlled manner to facilitate sliding through the channel 147. Once the battery isolation tab 103 is removed, the battery 129 will be in direct contact with the first and second connection terminals 131a and 131b, thereby allowing the battery to provide power for normal operation of the device 101.

Figure 9:
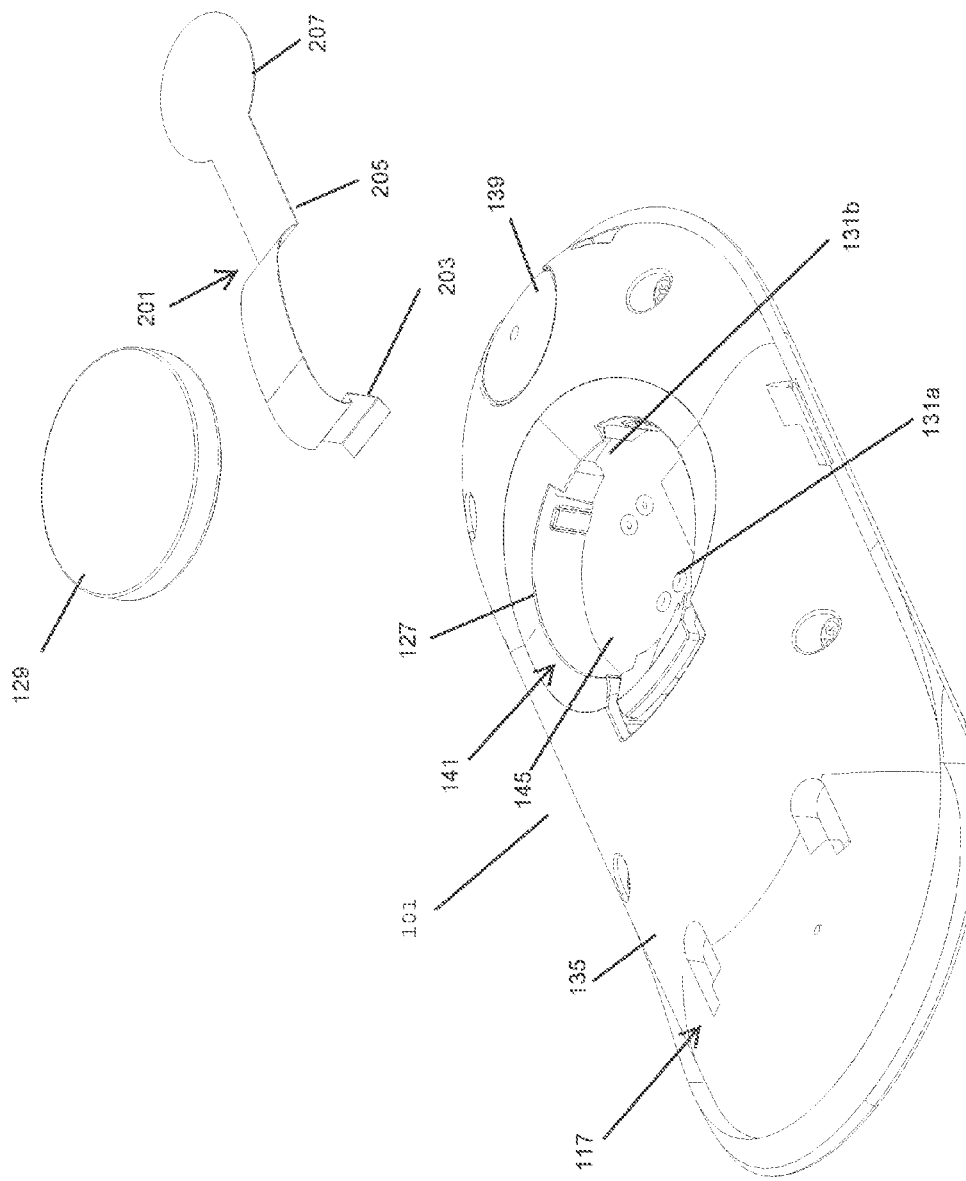
FIG. 9 is a partially exploded upper rear isometric view of a handheld device with another embodiment of a battery isolation tab.

FIG. 9 is a partially exploded upper rear isometric view of the handheld device 101 with another embodiment of a battery isolation tab 201. The device 101 can be substantially similar to that described above with respect to FIGS. 1-8, with the rear housing 109 not shown in FIG. 9 for purposes of clarity. The battery isolation tab 201 can be similar to the battery isolation tab 103 described above with respect to FIGS. 1-8, except that the head portion 203 of the battery isolation tab 201 is configured to cover only the second connection terminal 131b within the battery pocket 141. Additionally, the neck portion 205 of the battery isolation tab 201 extends over the rear surface 135 of the support body portion 117 rather than extending through a channel. As illustrated, the neck portion 205 of the battery isolation tab 201 extends between the head portion 203 and the handle portion 207 which extends away from the device 101.

FIGS. 10A-10C illustrate different embodiments of battery isolation tabs. As illustrated, the battery isolation tab can take various different shapes. The battery isolation tab 301 shown in FIG. 10A includes a head portion 303, a handle portion 307, and a neck portion 305 extending between the head portion 303 and the handle portion 307. The head portion 303 and the handle portion 307 are each wider than the neck portion 305. The head portion 303 tapers outwardly forming an oval shape configured to overlay the electrical connection terminals when in position in the device. The wider handle portion 307 provides a gripping surface for a user to remove the battery isolation tab 301 and to prevent the handle portion 307 from inadvertently being retracted into the channel.

The battery isolation tab 311 shown in FIG. 10B is similar to that of FIG. 10A, except that the head portion 313 is substantially wider than both the neck portion 315 and the handle portion 317. The wider head portion 313 can aid in isolating the electrical connection terminals from the battery. The battery isolation tab 321 shown in FIG. 10C has a head portion 323, neck portion 325, and handle portion 327 all having substantially the same width. This configuration can improve the ability of the head portion 323 to be pulled through the channel during removal of the battery isolation tab 321, and depending on the placement of the electrical connection terminals, the head portion 323 may be configured to overlay and isolate one or more of the electrical connection terminals from the battery. These various embodiments of battery isolation tabs 301, 311, 321 illustrate some of the ways that these tabs can vary in size and shape, while still providing an effective way to electrically isolate the battery from the electrical connection terminals of the device.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

We claim:

1. A handheld remote control assembly, comprising:
   a body disposed between a front cover and a rear cover;
   a battery pocket formed in the body and defined by a sidewall and a lower surface;
   an electrical connection terminal in the battery pocket;
   a battery disposed within the battery pocket adjacent to the electrical connection terminal;
   a battery isolation tab comprising:
   a head portion positionable between the battery and the electrical connection terminal;
   a handle portion disposed external to the body; and
   a contoured neck portion extending between the head portion and the handle portion, the neck portion extending over a rear surface of a tab support portion of the body such that the neck portion follows a contour of the rear surface of the tab support portion and is disposed between the tab support portion and the rear cover, wherein the tab support portion extends between the battery pocket and an edge of the body;

wherein the battery isolation tab is movable between installed and removed positions, in the installed position the head portion blocks the battery from engaging the electrical connection terminal, and in the removed position the head portion is away from the electrical connection terminal that allows the battery to engage the electrical connection terminal, and wherein a portion of the battery isolation tab extends through an opening at a junction of the front cover and the rear cover.

2. The assembly of claim 1 wherein the battery isolation tab comprises a flexible non-conductive material configured to electrically isolate the battery from the electrical connection terminal.

3. The assembly of claim 1 wherein the tab support portion is a channel formed in a rear surface of the body.

4. The assembly of claim 1 wherein the battery isolation tab is configured for engagement of the handle portion by a user to pull the handle portion in an axial direction to move the battery isolation tab to the removed position.

5. A handheld remote control assembly, comprising:
a body comprising;
a front surface and a rear surface opposite the front surface;
a battery pocket formed in the rear surface, the battery pocket defined by at least one sidewall and a lower surface;
a front housing removably covering the front surface of the body;
a rear housing removably covering the rear surface of the body;
a battery in the battery pocket;
an electrical connection terminal disposed on the lower surface and positioned for engagement with the battery in the battery pocket; and
a battery isolation tab removably connected to the body with at least a portion of the battery isolation tab being in the battery pocket between the battery and the electrical connection terminal, the battery isolation tab electrically separating the battery and the electrical connection terminal from one another until the portion of the isolation tab is removed from the battery pocket,
wherein the body has a tab support portion extending between the battery pocket and an edge portion of the body and supporting a contoured intermediate portion of the battery isolation tab such that the intermediate portion of the battery isolation tab follows a contour of the tab support portion, and
wherein the rear housing comprises an opening configured to receive a portion of the battery isolation tab therethrough.

6. The assembly of claim 5, further comprising a channel formed in the body and extending between the battery pocket and an edge of the body, wherein the channel is formed in the rear surface of the body.

7. The assembly of claim 5 wherein the battery isolation tab comprises:
a first portion between the battery and the electrical connection terminal;
a second portion external to the body and configured to be grasped for removal of the first portion from the battery pocket; and
the contoured intermediate portion extending between the first and second portions, the intermediate portion at least partially supported on the tab support portion of the body between the battery pocket and an edge of the body.

8. The assembly of claim 7 wherein the second portion is wider than the intermediate portion.

9. The assembly of claim 7 wherein the battery isolation tab is configured such that pulling on the second portion axially in a direction away from the body moves the battery isolation tab along the tab support portion and removes the first portion from the battery pocket and allows the battery to engage the electrical connection terminal.

10. The assembly of claim 5, further comprising a second electrical connection terminal in the battery pocket, wherein the battery isolation tab is between the battery and the second electrical connection terminal.

11. The assembly of claim 10 wherein the second electrical connection terminal is disposed adjacent to the sidewall.

12. A method of assembling a remote control unit, the method comprising:
providing a body comprising:
a battery pocket formed in the body;
an electrical connection terminal in the battery pocket; and
a tab support portion extending between the battery pocket and an edge of the body;
disposing a battery isolation tab at least partially within the battery pocket with the battery isolation tab covering the electrical connection terminal and at least partially supported on the tab support portion such that a portion of the battery isolation tab follows a contour of the tab support portion;
inserting a battery into the battery pocket such that the battery isolation tab is between the battery and the electrical connection terminal and electrically separating the battery from the electrical connection terminal;
disposing a front housing over the front surface of the body; and
disposing a rear housing over the rear surface of the body, such that a portion of the battery isolation tab extends through an opening at a junction of the front housing and the rear housing.

13. The method of claim 12 wherein the tab support portion is a channel, and disposing the battery isolation tab at least partially within the battery pocket comprises disposing a neck portion of the battery isolation tab within the channel.

14. The method of claim 12 wherein disposing the battery isolation tab at least partially within the pocket further comprises disposing a handle portion of the battery isolation tab external to the body.

15. The method of claim 12 wherein the battery isolation tab electrically isolates the battery from the electrical connection terminal.

16. The method of claim 12 wherein the body further comprises a second electrical connection terminal in the battery pocket, and wherein disposing the battery isolation tab at least partially within the battery pocket further comprises disposing the battery isolation tab over the second electrical connection terminal to electrically separate the second electrical terminal from the battery in the battery pocket.

17. The method of claim 12 wherein the electrical connection terminal is a first electrical connection terminal, and the body further comprises a second electrical connection terminal in the battery pocket, and wherein disposing the battery isolation tab at least partially within the battery pocket comprises disposing the battery isolation tab over the first electrical connection terminal with the second electrical terminal uncovered and in engagement with the battery.

* * * * *